United States Patent [19]

Stoerk et al.

[11] Patent Number: 4,548,467

[45] Date of Patent: Oct. 22, 1985

[54] RELEASABLE OPTICAL FIBER CONNECTOR HAVING FLEXIBLE WEBS AND UNDERSIZED GROOVES

[75] Inventors: Peter Stoerk, Poecking; Güenter Thom, Gauting, both of Fed. Rep. of Germany

[73] Assignee: Siemens Aktiengesellschaft, Berlin & Munich, Fed. Rep. of Germany

[21] Appl. No.: 462,805

[22] Filed: Feb. 1, 1983

[30] Foreign Application Priority Data

Feb. 5, 1982 [DE] Fed. Rep. of Germany ....... 3203929

[51] Int. Cl.⁴ .................................................. G02B 7/26
[52] U.S. Cl. .............................. 350/96.21; 350/96.22
[58] Field of Search .................. 350/96.20, 96.21, 96.22

[56] References Cited

U.S. PATENT DOCUMENTS

| 4,116,532 | 9/1978 | Hubbard et al. | 350/96.21 |
| 4,146,299 | 3/1979 | Wellington et al. | 350/96.21 |
| 4,186,997 | 2/1980 | Schumacher | 350/96.21 |

FOREIGN PATENT DOCUMENTS

| 2524644 | 12/1976 | Fed. Rep. of Germany . | |
| 2525132 | 1/1977 | Fed. Rep. of Germany ... | 350/96.21 |
| 2803570 | 8/1979 | Fed. Rep. of Germany . | |

*Primary Examiner*—William L. Sikes
*Assistant Examiner*—Frank González
*Attorney, Agent, or Firm*—Hill, Van Santen, Steadman & Simpson

[57] ABSTRACT

A coupling device for releasably coupling a first optical waveguide to a second optical waveguide with an end-to-end alignment characterized by a first coupling part having a seating surface with a longitudinally extending channel, at least one second coupling part having a support part with an end of a first waveguide being secured to a longitudinally extending undersized groove provided on the support part. The second coupling part further comprises flexible webs for mounting the support part in the second coupling part for movement transverse to the axis of the first waveguide and to press the end of the first waveguide into the channel when the second and first coupling parts are assembled together so that the first waveguide is received in the channel aligned with the end of the second waveguide to couple the waveguides together.

16 Claims, 3 Drawing Figures

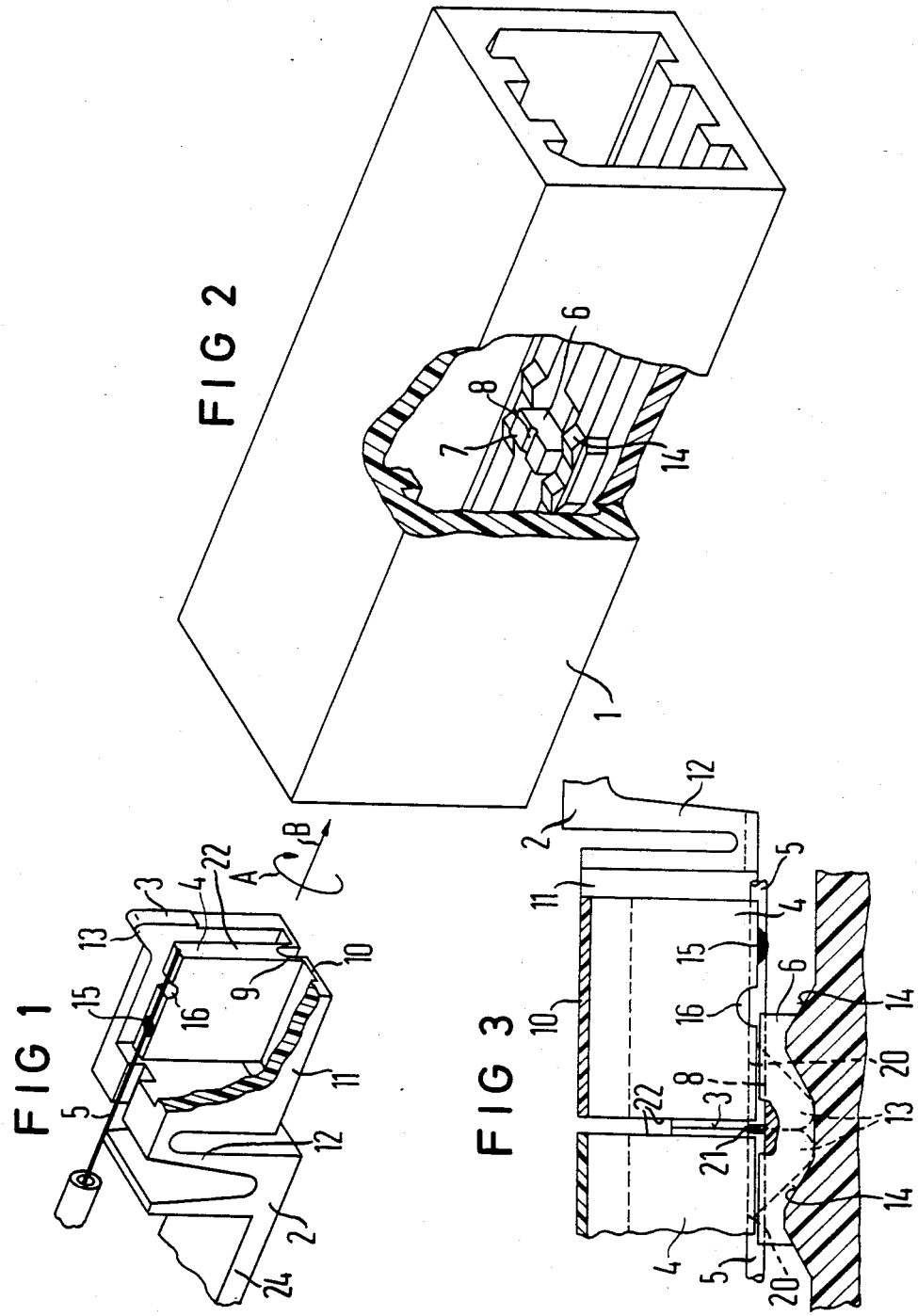

RELEASABLE OPTICAL FIBER CONNECTOR HAVING FLEXIBLE WEBS AND UNDERSIZED GROOVES

BACKGROUND OF THE INVENTION

The present invention is directed to a device for releasably coupling fiber optical waveguides in an end-to-end alignment so that in the coupled condition the optical waveguides rest in a longitudinally extending groove in a seating surface of a first coupling part with the end faces of the waveguides in alignment with each other.

A coupling device which has a pair of waveguides resting in a groove with the end faces being aligned is disclosed in German No. OS 28 03 570. According to the disclosure of this German reference, a V-groove is formed in a base body of a plug device for optical waveguides and this groove receives the fiber optical waveguides which project into the coupling area. In this coupling area, two mutually abutting ends of the fiber optical waveguides are pressed into the bottom of the groove by means of resilient pressure elements so that a separate centering operation is not necessary. Such an arrangement, however, makes it necessary that the ends of the fiber optical waveguides must project from the plug parts in which they are mounted so that they can be grasped by the pressure element. This, however, produces a danger that the projecting unprotected sensitive ends of the fiber optical waveguides may be damaged during the plugging-in operation. One must count on damage and wear to the fibers and also damage and wear to the grooves or the pressure elements particularly when a high number of plugging operations are necessary.

SUMMARY OF THE INVENTION

The present invention is directed to providing a coupling device which will releasably couple a pair of optical waveguides wherein the danger of damaging the ends of the fiber optical waveguides when joining the coupling parts is reduced.

To accomplish these goals, the present invention is directed to an improvement in a coupling device for releasably coupling a first fiber optical waveguide to a second fiber optical waveguide with an end-to-end alignment, said device including a first coupling part having a seating surface with a longitudinally extending channel and at least one second coupling part supporting an end of a first waveguide and being coupled to the first part with the end of the first waveguide being received in a channel and aligned with the end of the second waveguide to couple two waveguides together. The improvement comprises the second coupling part having a support part with the end of the first waveguide being secured thereto and means for mounting the support part in the second coupling part for movement transverse to the axis of the first waveguide and to press the end of the first waveguide into said channel when the second and first coupling parts are assembled. The invention makes it possible to secure the full length of the fiber optical waveguide end to the retaining or support part. The waveguide is thus protected against bending when threaded into a longitudinally extending groove or channel and thus the danger of breakage is reduced. However, due to the lateral mobility of the support part, the end of the fiber optical waveguide can nonetheless be precisely centered in the longitudinally extending channel of the first coupling part. The end of the fiber optical waveguide can, for example, be fixed to the retaining part by means of gluing. For the purpose of being able to press the end of the fiber optical waveguide resiliently into the bottom of the longitudinal groove or channel of the first coupling part, one needs only to exert a corresponding pressure on the support part so that the danger of damage to the fiber optical waveguide fiber is likewise reduced.

Preferably, the support or retaining part has a longitudinally extending groove in a support surface thereof which groove will face the seating surface when the second coupling part is introduced into the first coupling part. This groove is dimensioned so that the fiber optical waveguide when secured in the groove has at least half its thickness projecting from the groove, the waveguide is mounted in the groove so that the end of the waveguide immediately adjacent the end face is engaged by the groove and a portion of the longitudinally extending channel when the two coupling parts are assembled together. By providing a longitudinal groove in the retaining part, it is possible to fix the end of the fiber optical waveguide therein without any adjustment work. For example, the fiber optical waveguide can be glued into the groove. Therewith, the end of the fiber optical waveguide is already precentered relative to the longitudinal groove of the other coupling parts such that it engages into the shared longitudinal groove or channel without additional external influences when the coupling parts are plugged together.

Preferably, the means for mounting the support part in each of the second coupling parts includes at least one flexible web so that the support part is resiliently deflectable relative to the second part. This provision of the flexible web enables the lateral mobility of the retaining part in a simple manner without one needing to forego a precise precentering of the end of the fiber optical waveguide during a coupling operation.

The end of the fiber optical waveguide can be deflected parallel to the axis by means of an additional feature which is that the flexible web extends in a longitudinal direction of the groove and has a flexural axis which is disposed parallel to the end of the fiber optical waveguide received in the groove. Thus, tilting the end of the fiber optical waveguide is thereby avoided. Such tilting would occur if the flexural axis were to extend perpendicularly to the fiber optical waveguide. The term flexural axis is hereby to be understood as though instead of a flexible web, a hinge was disposed in this particular area and the axis of rotation of the hinge corresponds to the flexural axis of the web. It is expedient in terms of manufacturing technology to combine the retaining part or support part with the web as a single piece. Thus, the web and retaining parts are represented as a body whose end carries the fiber optical waveguide and functions as the support part.

Preferably, the above mentioned web is secured by at least one additional web which extends at right angles thereto and this additional web has a flexural axis arranged parallel to the longitudinally extending groove. Thus, the pair of webs enable a deflection of the end of the fiber optical waveguide parallel to the axis which is perpendicular relative to the seating surface, which has the longitudinal groove. As a result, the fiber optical waveguide end can be inserted with a bias into the longitudinal groove so that it is exactly fixed in its desired position. Moreover, due to the deflectability of the support part perpendicular relative to the seating surface, it is also possible to lift the end of the fiber optical waveguide and to lower it into the longitudinal groove in the final phase of the plug-in operation. By so doing, friction, wear and damage to the end of the fiber optical waveguide during a plugging-in operation is largely avoided. Preferably, the support part is mounted by two pairs of the webs which pairs are arranged symmetrically with respect to the support part and prevent the support part from being subjected to a lateral offset when being lifted.

It is possible that the means for mounting will resiliently mount the support part in the second plug part for movement in a direction extending parallel to the longitudinal channel of the first part. This resilient seating of the support or retaining part will cause a corresponding pressing against the first coupling part with a bias. By so doing, a precise allocation of the retaining part to the first coupling part is enabled independent of manufacturing tolerances and of the influence of external forces on the plug. The spring effect can be realized in a simple manner by means of the provision of a resilient cross-stay having a flexural axis extending perpendicular relative to the longitudinal channel which cross-stay connects the body of the second plug part to the intermediate part which supports the support part. Preferably, the intermediate part includes guide pieces having a stop provided on the end face thereof and the support part is connected to each of the guide pieces by at least one pair of webs each extending parallel to the axis of the waveguide attached to the support part and the webs of each pair extend at right angles to each other. The pair of webs will mount the support part on the guide piece with the end surface being spaced slightly inward from the stop surface and the cross-stay will resiliently bias the stop faces of the guide piece against the stop surface on the first coupling part which stop surface may be provided on a third coupling part which is identical to the first coupling part. This provision has the support parts remaining precisely fixed in this position relative to the other coupling parts even given the influence of external forces on the plug or coupling device without the latter mobility of the support part being negatively influenced by frictional forces which would occur given direct seating against the corresponding cooperative surface. This is guaranteed, for example, by an additional development which is that the end face of the optical waveguide and the end surface of the support part are both set back a slight amount relative to the stop faces or stop surfaces.

It is also desirable to provide means to resiliently seat the entire guide pieces of the second coupling part in the first coupling part. This is accomplished by the cross-stay having a transverse web member which is bent back on itself to provide a U-shaped cross-section taken in a direction extending parallel to the axis of the waveguide and this cross-stay will connect the guide pieces to the body of the second coupling part.

Preferably, the first coupling part has a cam surface extending perpendicular to the seating surface and each of the guide pieces will have a cam follower for engaging this cam surface to cause the guide piece and support member to be moved in a plane extending perpendicular to the seating surface as the two parts are assembled or coupled together. Because of this structure, the guide piece and thus the retaining parts are first lifted relative to the seating surface when the two coupling parts are joined and then lowered into the final phase of the plugging operation. Thus, there is no need for a direct influence on the support part for this purpose so that its lateral deflectability is not negatively influenced.

The angular position of the support part or retaining part relative to the first coupling part is guaranteed by means of the further development. This further development is that the first coupling part has means for holding the guide pieces in a fixed position without play when the first and second parts are coupled together. This development will enable a bend-free alignment of the two fiber optical waveguide ends.

A plurality of fiber optical waveguides can be connected to one another in a simple manner and without significant added outlay by means of a further development which is that the support part has a supporting surface with at least one longitudinally extending groove therein and that the seating surface of the first part and the support surface of the second part have a plurality of parallel extending grooves disposed therein for acceptance of a fiber optical waveguide having a tight axial spacing. The space fluctuations between the longitudinal channels and the longitudinal grooves can be kept very slight by means of this tight axial spacing. Thus, by providing more than one groove in each support part and more than one channel in the seating surface, more than one pair of optical fibers can be connected together.

It is also possible to create an optical switch if the means for mounting the support part in the second coupling part enables transverse deflection of the support part a distance of at least the axial spacing between two adjacent channels or grooves. Thus, by means of occupying adjacent longitudinal channels with a fixed fiber optical waveguide, it is also possible to perform a changeover switch. As a result of a compressive force effective perpendicular to the seating surface, the deflectable fiber optical waveguide is held in each of the two switch states whereby the switch can be bistably designed. The switching expediently occurs by means of external influences on the guide piece and the retaining part. Thus, the guide piece is first lifted and the retaining part is then laterally deflected and lowered together with the guide piece. Such a combination consisting of a plug and switch is particularly advantageous since a switch is usually designed with plug connections anyway. Given a switch having a standard structure, respectively plug-type connections are required for that purpose for each of the two fiber optical waveguides so that the manufacturing outlay is multiplied.

Another development according to the present invention is that the first coupling part has a sleeve-like arrangement for receiving the second coupling part as a plug-in member. Thus, the two coupling parts can be produced at a very low manufacturing cost. Plugging the coupling parts together requires only a slight operative outlay. Given a mere snap-in connection in contrast to a stable screw-type connection, external forces can influence the position of the coupling parts relative to one another. This influence, however, is compensated by the resilient seating of the retaining support part. If the first coupling part comprises a sleeve-like member having opposite ends open for receiving the second coupling part, then a third coupling part identical to the second coupling part can be provided to support the other or second fiber optical waveguide. The second and third coupling parts are each provided with stop surfaces which will engage each other as they are plugged into the sleeve-like first coupling part. The stop surfaces are arranged so that the end faces of the fiber optical waveguides carried by the second and third parts are disposed in a common longitudinal channel and are closely adjacent each other. Thus, the center or first coupling part serves only to accept and to hold the second and third coupling parts together and also serves for the mutual alignment of the two fiber optical waveguide ends in the shared longitudinal channel. The center sleeve-like coupling part is thus symmetrically designed. In the event that the longitudinal channels are overlapped by two retaining or support parts proceeding from both ends, they can be designed as simple through, straight line recesses with easy access. The same also applies to the support parts with the longitudinal grooves. As a result of good accessibility of the longitudinal grooves and the longitudinal channels as well as because of the self-centering in the longitudinal groove, all the coupling parts can be shaped of synthetic plastics which are produced by an injection-molding method. After the ends of the fiber optical waveguides have been fixed in the longitudinal grooves, the coupling parts can be plugged together without an adjustment operation.

If the support part has a longitudinally extending channel or groove for receiving the waveguide, then each of the channels in the support part as well as in the seating surface will have a curved circular cross-section or radius slightly greater than the radius of the optical waveguide. Such an arrangement will enable a sure insertion of the optical waveguide fibers into the longitudinal channels or grooves. Differences of diameter in the fiber optical waveguides will only have a slight offset whereas utilizing a wedge-shaped channel or groove, differences in the diameter of the waveguides will greatly increase the offset.

Preferably, the seating surface of the first coupling part is in a block member provided in the interior of the first coupling part and the means for mounting the support part on the second member includes a pair of guide means which are laterally spaced apart and adapted to be received on opposite sides of the block member as the second coupling part is assembled with the first coupling part. This arrangement which provides a direct and therefore very precise allocation of the guide pieces to the block of the sleeve-like first coupling part insures a precise location of the two parts when assembled together.

While the above discussion has been directed to connecting the ends of two optical fibers, one of the optical fibers could be a waveguide of an opto-electrical coupling element. Thus, the coupling device does provide an advantage of friction-free self-centering insertion of a fiber optical waveguide end into the longitudinal channel for coupling to an optical connection of an element such as a transmitting diode.

BRIEF DESCRIPTION OF THE DRAWINGS

FIG. 1 is a perspective view with portions broken away for purposes of illustration of one of the plug parts utilized to form the coupling device of the present invention;

FIG. 2 is a perspective view of a second plug part with portions broken away of the coupling device of the present invention with the second part being rotated on its axis by 180°; and FIG. 3 is a partial longitudinal section through two of the coupling parts in the area of the coupling location for two light waveguides after the assembly of the plug parts of FIGS. 1 and 2.

DESCRIPTION OF THE PREFERRED EMBODIMENT

The principles of the present invention are particularly useful in a coupling device for optically coupling a pair of ends 5 of a pair of waveguides (FIG. 3). The device includes a first coupling part 1 (FIG. 2) which has a sleeve-like configuration. For purposes of better illustration, a second coupling part 2 (FIG. 1) is shown rotated around an axis B by 180° as indicated by the arrow A. The second coupling part 2 has a support part or retaining part 4 which is provided with a longitudinally extending groove 20 that receives the end 5 of an optical fiber which forms the light waveguide. The fiber or waveguide is secured in the groove 20 by an adhesive or glue 15. To prevent the adhesive from flowing during the gluing operation into the area immediately adjacent an end face 21 of the end 5 of the fiber and interfere with forming the coupling, a cross-channel 16 is provided in the support part 4.

The first coupling part 1 has a block-like support block member or fixed carrier part 6 which projects from the internal surface of the part and is disposed in the center of the part. The support block member has an upper or seating surface 7 which is provided with at least one longitudinally extending channel or groove 8. The longitudinal groove or channel 8 and the longitudinal groove 20 of the support part 4 are designed so that they engage approximately one-half of the cross-section of the end 5 of the waveguide when the coupling parts 1 and 2 are in an assembled condition as illustrated in FIG. 3. In the assembled or connected condition of the coupling parts 1 and 2, the surface of the support part 4 which has the light waveguide 5 will overlap the upper or seating surface 7 to approximately the center of the fixed carrier part 6. Thus, the end 5 of the light waveguide is centered in the longitudinal groove or channel 8. The other light waveguide held by a coupling part which is similar to part 2 and extends in from the opposite end of the part 1 will also be centered in the channel 8.

The support part 4 is connected to a pair of guide pieces 11 of the part 2 by a pair of vertically extending flexible webs 9 which are connected respectively to a pair of horizontally extending flexible webs 10. Both the webs 9 extend parallel to the end 5 of the waveguide held on the part 4 so that the part 4 can be resiliently deflected in a lateral direction with the axis of the waveguide being maintained or moving parallel. The pair of webs 10 also extend parallel to the end 5 of the light waveguide but at right angles to the webs 9. Thus, the elastic or resilient mounting of the part 4 in the guide pieces 11 enables movement both vertically and laterally with the axis of the end 5 remaining substantially parallel. As illustrated, the webs 10 extend between the webs 9 and the guide pieces 11.

The guide pieces 11 are connected to a body 24 of the coupling part 2 by a cross-stay 12 which extends at right angles relative to light waveguides and allows a bending in a direction transverse to the axis of the waveguide and thus allow a bending of the axis of the waveguide when moving the guide parts 11. The cross-stay 12, as illustrated, is a transverse web member bent back on itself to provide a U-shaped cross-section taken in a direction of the axis of the end 5. Each of the guide pieces 11 adjacent an end thereof is provided with a cam-like projection or cam follower 13. When the coupling part 2 is inserted into the sleeve or coupling part 1, the cam-like projections 13 will slide over a corresponding ramp or cam surface 14 provided in the sleeve 1. As a result, the guide pieces 11 which support the support part 4 is lifted and then lowered in the final phase of the insertion operation. Therefore, the light waveguide end 5 is not longitudinally abutted with the other waveguide but rather transversely introduced into the longitudinal channels 8 during the plug-in operation. As a result of the lateral resiliency, the support part 4 with the light waveguide 5 therefore centers itself in the longitudinal channel 8. The flexible webs 10 which extend parallel to the surface 7 enable the end of the light waveguide 5 to be pressed under tension into the bottom of the longitudinal channel 8 in the coupled condition. The cross-stay 12 makes it possible to press a detent surface 3 on each of the guide pieces 11 against the corresponding cooperating stop surface or detent surface at a desired pressure and thus secures the parts 2 in the axial position in the sleeve 1. The guide piece is dimensioned with the projections 13 such that an axial parallel position of the support part 4 is guaranteed in the lowered condition. The spacing between the pieces 11 is dimensioned such that they engage the lateral surfaces of the fixed carrier 6 and the ramps 14 extend on opposite sides of the carrier 6.

As best illustrated in FIG. 3, the detent surface or stop surfaces 3 of the two coupling parts 2 engage one another under an axial prestress at the level of the coupling location. The end faces 21 of each of the light waveguide ends 5 are set back by a slight degree relative to this bearing surface and likewise project by a slight degree beyond each end face 22 of the support part 4 which are spaced apart an even greater distance. It is thereby guaranteed that no friction which would negatively influence the mobility of the support part 4 occurs between the two adjacent support parts and the ends of the light waveguides 5 during a centering operation.

As illustrated, the coupling parts 1 and 2 have only a single channel 8 and each coupling part 2 has only a single fiber so that only a single pair of fibers will be coupled together. More than one pair can be coupled together if the carrier or block member 7 has a plurality of parallel extending channels 8 and if each support part has the same number of grooves 20 with the same spacing. Also, a switch can be constructed when more than one channel 8 is present in the surface 8. The lateral movement of the support part 4 to position the fiber in different channels during an assembly operation would enable switching the connection.

Although various minor modifications may be suggested by those versed in the art, it should be understood that we wish to embody within the scope of the patent granted hereon, all such modifications as reasonably and properly come within the scope of our contribution to the art.

We claim:

1. In a coupling device for releasably coupling a first fiber optical waveguide to a second fiber optical waveguide with an end-to-end alignment, said device including a first coupling part having a seating surface with a longitudinally extending channel and a second coupling part supporting an end of the first waveguide and being coupled to the first part with the end of the first waveguide being received in the channel and aligned with the end of the second waveguide to couple the two waveguides together, the improvements comprising said second coupling part having a support part with a longitudinally extending groove facing the seating surface, the end of the first waveguide being received in said groove and being secured to the support part, said groove being dimensioned so that, when the first waveguide is received therein, at least half the thickness of the first waveguide projects therefrom, and the end of the first waveguide immediately adjacent its end face is engaged by the groove and a portion of the longitudinally extending channel of the first coupling part; and means for mounting the support part in the second part for movement transverse to the axis of the first waveguide and to press the end of the first waveguide into said channel when the second and first coupling parts are assembled together, said means for mounting the support part including at least one flexible web extending in a longitudinal direction of the groove and having a flexural axis which is disposed parallel to an end of the first fiber optical waveguide received in the groove so that the support part is resiliently deflectable relative to the second part.

2. In a coupling device according to claim 1, wherein the first coupling part is a sleeve member for receiving the second coupling part as a plug-in member.

3. In a coupling device according to claim 1, wherein the first coupling part comprises a sleeve member having opposite ends open for receiving the second coupling part, said device including a third coupling part of identical structure to the second coupling part, said second and third coupling parts each having stop faces engaging each other as the second and third parts are plugged into the sleeve first coupling part, said stop faces being arranged so that the end faces of the optical waveguides carried by the second and third parts are disposed in a common longitudinal channel and are closely adjacent each other.

4. In a coupling device according to claim 1, wherein the seating surface is in a block member provided in the interior of the first coupling part, and wherein said means for mounting the support part on the second coupling part include a pair of guide pieces laterally spaced apart and adapted to be received on opposite sides of the block member as the second coupling part is assembled with the first coupling part.

5. In a coupling device according to claim 1, wherein one of said first and said second optical waveguides is a waveguide of an optoelectrical coupling element.

6. In a coupling device according to claim 1, wherein the web is secured to at least one additional web extending at right angles thereto, said additional web having a flexural axis arranged parallel to the longitudinally extending groove.

7. In a coupling device according to claim 6, wherein the flexible web and the additional web are arranged as a pair and which device includes another pair of a flexible web and an additional web, said pairs being disposed symmetrically relative to the axis of the end of the first optical waveguide.

8. In a coupling device according to claim 1, wherein the support part has a supporting surface with the longitudinally extending groove formed therein, and wherein at least one of the seating surface of the first part and the supporting surface of the second part have a plurality of parallel extending grooves disposed therein for acceptance of a fiber optical waveguide having a tight axial spacing.

9. In a coupling device according to claim 8, wherein means for mounting the support part in the second coupling part enables transverse deflection of the support part a distance of at least the axial spacing between adjacent grooves.

10. In a coupling device according to claim 1, wherein the means for mounting resiliently mounts the support part in the second part for movement in a direction extending parallel to the longitudinally extending channel in the first part.

11. In a coupling device according to claim 10, wherein the means for mounting also include a resilient cross-stay having a flexural axis extending perpendicular relative to the longitudinally extending channel, said cross-stay connecting the body of the second part to an intermediate part which supports the support part.

12. In a coupling device according to claim 11, wherein the intermediate part includes a guide piece having a stop face provided on an end face thereof, said support part being connected to the guide piece by a pair of webs with the webs of the pair extending at right angles to each other, said pair of webs mounting the support part on the guide piece with an end surface of the support part being spaced slightly inward from said stop face, said cross-stay resiliently biasing the stop face of the guide piece against a stop surface in the first coupling part.

13. In a coupling device according to claim 12, wherein the cross-stay comprises a transverse web member bent back on itself to provide a U-shaped cross-section taken in a direction extending parallel to the axis of the first waveguide, said cross-stay connecting a pair of guide pieces to the body of the second coupling part.

14. In a coupling device according to claim 12, wherein an end face of the first waveguide and the end surface of the support part are both set back a slight amount relative to the stop face of the guide piece.

15. In a coupling device according to claim 12, wherein the first coupling part has a cam surface extending perpendicular to the seating surface and the guide piece has a cam follower for engaging said cam surface to cause said guide piece and support part to be moved in a plane extending perpendicular to the seating surface as the two parts are assembled together.

16. In a coupling device according to claim 15, wherein said first coupling part has means for holding the guide piece in a fixed position without play when the first and second parts are coupled together.

* * * * *